(12) United States Patent
Iordache et al.

(10) Patent No.: US 10,938,067 B2
(45) Date of Patent: Mar. 2, 2021

(54) HYDROCARBON LIQUID ELECTROLYTE

(71) Applicant: COMMISSARIAT A L'ENERGIE ATOMIQUE ET AUX ENERGIES ALTERNATIVES, Paris (FR)

(72) Inventors: Adriana Iordache, Grenoble (FR); Lionel Picard, Seyssinet-Pariset (FR); Sebastien Solan, Seyssinet-Pariset (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 72 days.

(21) Appl. No.: 15/761,299

(22) PCT Filed: Sep. 19, 2016

(86) PCT No.: PCT/EP2016/072130
§ 371 (c)(1),
(2) Date: Mar. 19, 2018

(87) PCT Pub. No.: WO2017/050681
PCT Pub. Date: Mar. 30, 2017

(65) Prior Publication Data
US 2018/0269530 A1 Sep. 20, 2018

(30) Foreign Application Priority Data
Sep. 21, 2015 (FR) .................... 15 58851

(51) Int. Cl.
*H01M 10/0567* (2010.01)
*H01M 10/0525* (2010.01)
(Continued)

(52) U.S. Cl.
CPC ... *H01M 10/0567* (2013.01); *H01M 10/0525* (2013.01); *H01M 10/0568* (2013.01); *H01M 10/0569* (2013.01)

(58) Field of Classification Search
CPC ......... H01M 10/0525; H01M 10/0567; H01M 10/0568; H01M 10/0569
See application file for complete search history.

(56) References Cited

U.S. PATENT DOCUMENTS 5,882,812 A * 3/1999 Visco ...................... H01M 4/13
429/50
2002/0045101 A1 4/2002 Hwang et al.
(Continued)

FOREIGN PATENT DOCUMENTS

| CN | 103208648 A | * | 7/2013 | ........ H01M 10/0525 |
| CN | 104681302 A | * | 6/2015 | ............. H01G 11/60 |
| KR | 20140038677 A | * | 3/2014 | ........ H01M 10/0566 |

OTHER PUBLICATIONS

Scientific and Technical Information Center (STIC) search results from B. Burnette (Year: 2019).*
(Continued)

*Primary Examiner* — Victoria H Lynch
(74) *Attorney, Agent, or Firm* — Oblon, McClelland, Maier & Neustadt, L.L.P.

(57) ABSTRACT

The invention relates to a monophasic electrolyte medium comprising: at least one alkaline-earth or alkaline metal salt, at least one hydrocarbon solvent, and between 1 and 50 vol. %, in relation to the total volume of said medium, of a hydrocarbon solubilising agent, different from said hydrocarbon solvent, of formula (I): Z-[(A)-(X)]q-(B)—Y.

20 Claims, 2 Drawing Sheets

(51) Int. Cl.
H01M 10/0568 (2010.01)
H01M 10/0569 (2010.01)

(56) References Cited

U.S. PATENT DOCUMENTS

2011/0212362 A1  9/2011  Miyamori et al.
2015/0024267 A1  1/2015  Jung

OTHER PUBLICATIONS

Machine translation CN104681302(A) (Year: 2015).*
Machine Translation CN103208648(A) (Year: 2013).*
Machine Translation KR20140038677 (Year: 2014).*
International Search Report dated Dec. 6, 2016 in PCT/EP2016/072130 filed Sep. 19, 2016.
French Preliminary Search Report dated Mar. 11, 2016 in Patent Application No. 1558851 filed Sep. 21, 2015.
Juan Carlos Cuevas, et al., "Molecular Electronics an Introduction to Theory and Experiment" World Scientific Series in Nanoscience and Nanotechnology, vol. 1, 2010, 10 Pages.
Erik Kissa, "Solubilization of lithium carboxylates with carboxylic acids in hydrocarbon solvents" Journal of Colloid Science, vol. 18, 1963, pp. 147-156.
Yi-Chun Lu, et al., "Electrocatalytic Activity Studies of Select Metal Surfaces and Implications in Li-Air Batteries" Journal of the Electrochemical Society, vol. 157, No. 9, 2010, 11 Pages.

* cited by examiner

HYDROCARBON LIQUID ELECTROLYTE

The present invention relates to the field of batteries, notably Li-ion batteries, and is intended more particularly to propose a novel electrolyte for these.

An electrolyte is an ionic conductor which is essential in an electrochemical system, because it provides ionic charge transport between the electrodes. Conventional liquid electrolytes are composed of a supporting salt dissolved in a solvent or a mixture of organic solvents.

The supporting salt dissolved in the solvent must provide the best possible ionic conductivity.

As for the associated solvent medium, this must meet a number of requirements. It must have low viscosity, remain liquid over a wide temperature range, have a high dielectric constant so as to promote the dissociation of the associated supporting salt, and, evidently, be electrochemically stable over a large field of electroactivity.

As a general rule, no solvent can provide all these properties on its own, and it is often necessary to mix a number of solvents in order to meet all of these expectations.

For evident reasons, the optimization of the performance of Li-ion batteries is a constant aim.

It has recently been found that alkanes having a chain length of 2 to 16 carbon atoms have energy differences of more than 8 V between the HOMO and LUMO orbitals, and therefore a very wide range of electrochemical stability, in excess of 8 V (Cuevas et al. *Molecular Electronics An Introduction to Theory and Experiment*; 2010; Vol. 1). Consequently, hydrocarbon liquids, such as alkanes, are potentially very good solvents for the preparation of stable high- and low-voltage electrolytes.

Unfortunately, these solvents have a very poor solubilizing power. As has been stated, the use of these solvents in an electrolyte requires that the jointly considered supporting salt be present in a soluble form.

Organic salts of alkali metals having long aliphatic chains (that is to say, more than 6-8 carbon atoms) are potentially soluble in hydrocarbon liquids. The study of the dissolution of alkali salts of fatty acids in hydrocarbon solvents has also demonstrated that carboxylates of fatty acids, when considered individually, have very low solubility or are even insoluble in hydrocarbon liquids such as aromatic hydrocarbons (benzene and toluene) or aliphatic hydrocarbons such as paraffins, olefins, heptane and iso-octane. However, these salts may increase one another's solubility if they are used in the form of a mixture of three to four salts (Sandy et al. Mixture of alkali metal salts of fatty acids having improved solubility in liquid hydrocarbons, Jun. 26, 1962). Kissa et al. (Kissa et al. *J. Colloid Sci.* 1963, 18 (2), 147) has also shown that a mixed crystal having a composition of potassium carboxylate/corresponding fatty acid can be solubilized in a hydrocarbon liquid. However, the scale of solubilization of this carboxylate is highly dependent on the structure of the associated anion.

It follows from the above, therefore, that lithium, potassium and sodium carboxylate salts of the corresponding fatty acids have very low solubility in hydrocarbon liquids. For their part, the salts of alkali or alkaline earth metals, normally used as supporting salts, are insoluble in hydrocarbon liquids.

The specific object of the present invention is to propose a means for overcoming this defective solubility of the salts of alkali or alkaline earth metals, normally used as supporting salts, in hydrocarbon liquids.

The invention is also intended to propose a new electrolyte medium that has increased electrochemical stability at high and low voltage by comparison with conventional electrolytes, and, in particular, is compatible with use at potentials from 0.01 to 4.4 V.

Thus the present invention proposes a single phase electrolyte medium comprising:
  at least one supporting salt of alkali or alkaline earth metal, preferably a lithium salt,
  at least one hydrocarbon solvent, particularly in $C_6$ to $C_{18}$, and
  from 1% to 50%, by volume relative to the total volume of said medium, of at least one hydrocarbon solubilizing agent, distinct from said hydrocarbon solvent, corresponding to the formula (I):

$$Z\text{-}[(A)\text{-}(X)]_q\text{---}(B)\text{---}Y \qquad (I)$$

in which:
A and B, which are identical or different, represent a saturated, unsaturated and/or aromatic, linear, branched and/or cyclic hydrocarbon radical having 1 to 18 carbon atoms,
X is chosen from among oxygen and sulfur atoms and the radicals —$N(R^2)$—, —$B(R^2)$— and —$P(R^3R^2)$— where $R^2$ and $R^3$, identical or different, represent a hydrogen atom or an alkyl radical in $C_1$ to $C_4$,
q is equal to zero or is an integer varying from 1 to 8, where A and X may have identical or different definitions in each of the units -[(A)-(X)]—,
Z represents a hydrogen atom or a group —OH, —$OR^1$, —OM, —$NH_2$, —$NHR^1$, —$N(R^1)_2$, —$N(R^1)_3^+$, —COOH, —COOM, —$COOR^1$, —$OCOR^1$, —CN, $SO_3H$, or —$SO_3M$ where $R^1$ is an alkyl radical in $C_1$ to $C_4$ and M is a metal ion, or alternatively Z represents a cyclocarbonate radical with 5 or 6 links,
Y represents a group —OH, —$OR^1$, —OM, —$NH_2$, —$NHR^1$, —$N(R^1)_2$, —$N(R^1)_3^+$, —COOH, —COOM, —$COOR^1$, —$OCOR^1$, —CN, —$SO_3H$, or —$SO_3M$ where $R^1$ is an alkyl radical in $C_1$ to $C_4$ and M is a metal ion, or alternatively Y represents a cyclocarbonate radical with 5 or 6 links, or
Y and Z are linked to one another to form a polar pattern of the oxo, ether, ester, amino or secondary or tertiary amine type.

Preferably, the hydrocarbon solubilizing agent corresponds to the aforementioned formula (I) in which A and B, identical or different, have the formula —$C_aH_{2a}$—, where a is an integer between 6 and 18.

The present invention also proposes an accumulator, notably an Li-ion battery, comprising an electrolyte medium according to the present invention.

Surprisingly, the inventors have discovered that the association of a solubilizing agent according to the invention with a hydrocarbon solvent provides access to a novel electrolyte that has a significantly increased electrochemical stability and is capable of solubilizing the associated supporting salt or salts.

This capacity is notably reflected by the fact that the electrolyte medium according to the invention is a single phase medium.

For the purposes of the invention, a single phase medium is a medium in which no more than one phase can be discerned by microscopic examination.

In other words, the supporting salt is present in the solute state in the electrolyte medium of the invention. In this respect, the electrolyte medium according to the invention is different from a dispersion. Here, the supporting salt is not present, wholly or partially, in the particle state.

This solubility may have required the heating of the electrolyte medium of the invention to produce it. However, this solute state achieved by heating persists when the electrolyte medium is cooled to ambient temperature.

For the purposes of the invention, an ambient temperature is a temperature of 20° C.+/−2° C.

Other characteristics, variants and advantages of the invention will be more apparent from a perusal of the following description, examples and drawings, which are provided for illustrative purposes and do not limit the invention.

In the remainder of the text, the expressions "between . . . and . . . ", "in the range from . . . to . . . ", and "varying from . . . to . . . " are equivalent, and signify that the boundaries are included unless stated otherwise.

Unless specified otherwise, the expression "including/comprising a" is to be interpreted as "including/comprising at least one".

Hydrocarbon Solvent

For the purposes of the invention, a hydrocarbon solvent is a compound which is liquid at ambient temperature and atmospheric pressure, and is formed wholly or partially of carbon and hydrogen atoms.

Thus, a hydrocarbon solvent according to the invention may also comprise oxygen, sulfur, phosphorus or halogen atoms.

More precisely, the solvent according to the invention is chosen from among saturated, unsaturated and/or aromatic, linear, branched and/or mono- or polycyclic compounds having from 6 to 18 carbon atoms, in which the carbon chain may be interrupted, if necessary, by one or more heteroatoms, notably oxygen atoms.

According to an advantageous variant, the hydrocarbon solvent is solely composed of carbon and hydrogen atoms.

A hydrocarbon solvent suitable for the invention is preferably an aliphatic, acyclic or mono- or polycyclic or aromatic hydrocarbon.

For example, it may be chosen from among these solvents: n-octane, 2-methylheptane, 3-methylheptane, 4-methylheptane, 3-ethylhexane, 2,2-dimethylhexane, 2,3-dimethylhexane, 2,4-dimethylhexane, 2,5-dimethylhexane, 3,3-dimethylhexane, 3,4-dimethylhexane, 2-methyl-3-ethylpentane, 3-methyl-3-ethyl pentane, 2,3,3-trimethylpentane, 2,3,4-trimethylpentane, 2,2,3-trimethylpentane, 2,2,4-trimethylbutane, 2,2,3,3-tetramethylbutane, n-nonane, 2,2,5-trimethylhexane, n-decane, n-dodecane, 1-octene, 1-nonene, 1-decene, methylcyclohexane, ethylcyclohexane, p-menthane, bicyclohexyl, a-pinene, dipentene, decalin, tetralin, toluene, xylene, ethylbenzene, methylethylbenzene, cumene, mesitylene, butylbenzene, cymene, cyclohexylbenzene, diethylbenzene, pentylbenzene, dipentylbenzene, and mixtures thereof.

In the context of the present invention, hydrocarbon solvents may be individually or in combinations of two or more.

Preferably, the electrolyte medium comprises at least one saturated or unsaturated or aromatic hydrocarbon solvent.

According to an advantageous variant, this solvent is saturated and preferably comprises at least 7 carbon atoms, preferably from 7 to 12 carbon atoms.

Among the hydrocarbon solvents that are especially advantageous according to this variant, we may notably mention decalin, octane, iso-octane and cyclo-octane.

According to another advantageous variant, this solvent is aromatic and preferably comprises from 7 to 12 carbon atoms.

We may, notably, mention toluene as an especially advantageous hydrocarbon solvent according to this variant.

Advantageously, the hydrocarbon solvent or mixture of hydrocarbon solvents forms 20% to 80% of the total volume of the electrolyte medium.

Preferably, the hydrocarbon solvent or mixture of hydrocarbon solvents forms 80% of the total volume of the electrolyte medium.

Solubilizing Agent

The solubilizing agent required according to the invention is the decisive factor in providing access to a single phase electrolyte medium based on a mixture containing at least one hydrocarbon liquid solvent and at least one supporting salt, which are naturally stripped of any affinity for one another.

The solubilizing agent according to the invention may be used, notably, to solubilize the supporting salt and ensure that it has a solute state even in a mixture with the hydrocarbon solvent or solvents which are also required according to the invention.

Moreover, it must not affect the electrochemical stability of this hydrocarbon solvent medium, the profitable use of which is the specific aim of the invention.

The solubilizing agent is a compound with the formula (I):

$$Z\text{-}[(A)\text{-}(X)]_q\text{—}(B)\text{—}Y \qquad (I)$$

in which:

A and B, which are identical or different, represent a saturated, unsaturated and/or aromatic, linear, branched and/or cyclic hydrocarbon radical having 1 to 18 carbon atoms, preferably, A and B, identical or different, have the formula —$C_aH_{2a}$—, where a is an integer between 6 and 18, X is chosen from among oxygen and sulfur atoms and the radicals —N($R^2$)—, —B($R^2$)— and —P($R^3R^2$)— where $R^2$ and $R^3$, identical or different, represent a hydrogen atom or an alkyl radical in $C_1$ to $C_4$, q is equal to zero or is an integer varying from 1 to 8, where A and X may have identical or different definitions in each of the units -[(A)-(X)]—, Z represents a hydrogen atom or a group —OH, —$OR^1$, —OM, —$NH_2$, —$NHR^1$, —N($R^1$)$_2$, —N($R^1$)$_3^+$, —COOH, —COOM, —$COOR^1$, —$OCOR^1$, —CN, $SO_3H$, or —$SO_3M$, where $R^1$ is an alkyl radical in $C_1$ to $C_4$ and M is a metal ion, or alternatively Z represents a cyclocarbonate radical with 5 or 6 links, Y represents a group —OH, —$OR^1$, —OM, —$NH_2$, —$NHR^1$, —N($R^1$)$_2$, —N($R^1$)$_3^+$, —COOH, —COOM, —$COOR^1$, —$OCOR^1$, —CN, —$SO_3H$, or —$SO_3M$, where $R^1$ is an alkyl radical in $C_1$ to $C_4$ and M is a metal ion, or alternatively Y represents a cyclocarbonate radical with 5 or 6 links, or Y and Z are linked to one another to form a polar pattern of the oxo, ether, ester, amino or secondary or tertiary amine type.

Advantageously, this solubilizing agent is polar, notably in that, given the definition of Y, it has at least one polar group as defined above.

It is, notably, because of the presence of such a pattern that the solubilizing agent shows an affinity for the supporting salt or salts with which it is associated.

On the other hand, its hydrocarbon skeleton gives it an affinity for the associated hydrocarbon solvent.

Advantageously, the compound of formula (I) is saturated.

Advantageously, the radicals A and B, which are identical or different, represent a saturated, linear, or branched hydrocarbon radical, having from 1 to 18 carbon atoms.

Advantageously, the radicals A and B, which are identical or different, have the formula —$C_aH_{2a}$—, where a is an integer between 1 and 18, preferably between 6 and 12.

According to a particularly preferred embodiment, the radicals A and B, which are identical or different, have the formula —$C_aH_{2a}$—, where a is an integer between 6 and 18, preferably between 6 and 12.

According to a first variant, the compound of formula (I) is linear and saturated.

In particular, it is in $C_6$ to $C_{18}$, notably in $C_7$ to $C_{18}$.

Preferably, q is equal to zero.

Preferably, Z represents a hydrogen atom.

More preferably, Y is chosen from among the groups —OH, —$OR^1$, —OM, —$NH_2$, —$NHR^1$, —$N(R^1)_2$, —$N(R^1)_3^+$, —COOH, —COOM, —$COOR^1$, —$OCOR^1$, and —CN, where M and $R^1$ are as defined above, or Y represents a cyclocarbonate radical in $C_5$ or $C_6$.

Specific compounds representative of this variant are, notably, alkanols, alkyl esters, nitriles and alkyl cycloalkyl carbonates.

For example, these compounds may be octanol, iso-octanol, esters such as octyl acetate, hexyl acetate, nitriles such as nonane nitrile, and carbonates such as octylethylene carbonate.

According to another variant, the compound of formula (I) is cyclic and advantageously saturated.

In particular, it is in $C_6$ to $C_{18}$.

Preferably, q is different from zero, and X is advantageously an oxygen atom.

In this variant, Y and Z are linked covalently and preferably form an oxide pattern or an ether function, or an amine pattern.

Among the representatives of this variant of compounds, we may, notably, mention crown ethers and tetra-aza-cyclohexadecanes (cyclame family).

As a general rule, the amount of solubilizing agent is adjusted in the presence of the hydrocarbon solvent and the supporting salt considered jointly, in order to obtain a single phase medium that ensures the solubility of the salt.

In particular, the hydrocarbon solvent and the hydrocarbon solubilizing agent may be used with a volume or mass ratio of hydrocarbon solvent to solubilizing agent which is between 6/1 and 2/1, particularly between 5/1 and 3/1, and more particularly approximately 4/1.

The production of a single phase electrolyte medium according to the invention may be viewed with the naked eye, but may also be checked by measuring the conductivity of the liquid mixture formed, which must reach an optimal value. An appropriate measurement protocol, notably using impedance spectroscopy, for determining this value is illustrated in the example given below.

Evidently, the choice of solubilizing agent is advantageously made by considering its physicochemical compatibility with the hydrocarbon solvent and the supporting salt to be dissolved therein. This selection is clearly within the competence of those skilled in the art.

Compatible compounds include, notably, hydrocarbon solvents and solubilizing agents that have, respectively, an acyclic or cyclic saturated or unsaturated skeleton, and whose respective carbon numbers differ by less than 5 carbon atoms and preferably by less than 3 carbon atoms.

Thus it may be advantageous to consider a solubilizing agent such as acyclic alkanol, alkyl ester, nitrile or alkyl cycloalkyl carbonate in $C_6$ to $C_{12}$ if the hydrocarbon solvent jointly considered is a hydrocarbon in $C_6$ to $C_{12}$, such as decalin, octane, iso-octane, cyclo-octane, or toluene.

It may be advantageous to combine them in a volume or mass ratio of hydrocarbon solvent to solubilizing agent which varies from 50/5 to 30/20, particularly from 6/1 to 2/1, and notably from 5/1 to 3/1, and is preferably equal to approximately 4/1.

Among the hydrocarbon solvent/solubilizing agent pairs suitable for the invention we may, notably, mention decalin/octanol, octane/octanol, decalin/hexanol, iso-octane/iso-octanol, cyclooctane/octanol, decalin/octyl acetate, octane/octyle acetate, octane/nonane nitrile, decalin/octylethylene carbonate, and toluene/octylethylene acetate, octane/iso-octanol, iso-octane/nonane nitrile and toluene/octylethylene carbonate pairs.

As specified above, the electrolyte medium according to the invention comprises a solubilizing agent or agents as 1% to 50%, or preferably 5% to 25%, of its total volume.

Supporting Salt

The supporting salt contained in the electrolyte medium according to the invention is a salt of alkali or alkaline earth metal, preferably lithium.

It advantageously consists of a salt including at least the $Li^+$ cation. The salt is, for example, chosen from among $LiClO_4$, $LiAsF_6$, $LiPF_6$, $LiBF_4$, $LiR_FSO_3$, $LiCH_3SO_3$, $LiN(R_FSO_2)_2$, $LiC(R_FSO_2)_3$, and $C_6F_3LiN_4$ (lithium 2-trifluoromethyl-4,5-dicyanoimidazole); $R_F$ being chosen from among a fluorine atom and a perfluoroalkyl group comprising between 1 and 8 carbon atoms.

The amount of supporting salt in the electrolyte medium according to the invention is adjusted to optimize the ionic conductivity of the electrolyte. For evident reasons, this amount may therefore vary according to the chemical nature of the supporting salt concerned.

However, this quantity usually varies from 0.1 to 5 mol/L, notably for lithium salts, in the electrolyte medium.

Among the electrolyte media according to the invention which are particularly advantageous, we may notably mention those comprising at least:

a hydrocarbon solvent chosen from among the solvents decalin, octane, iso-octane, cyclo-octane, toluene and mixtures thereof, a solubilizing agent chosen from among octanol, hexanol, iso-octanol, octyl acetate, nonane nitrile, octylethylene carbonate, octylethylene acetate and mixtures thereof, particularly in a volume or mass ratio of hydrocarbon solvent to solubilizing agent which is between 6/1 and 2/1, particularly between 5/1 and 3/1, and more particularly approximately 4/1; and LiTFSI as a supporting salt, notably at a molar concentration from 0.1 to 1.0 mol/L in the electrolyte medium.

In particular, we may mention electrolyte media comprising at least:

a hydrocarbon solvent chosen from among the solvents decalin, octane, iso-octane, cyclo-octane, toluene and mixtures thereof, a solubilizing agent chosen from among octanol, octyl acetate, nonane nitrile, octylethylene carbonate and mixtures thereof, in a volume or mass ratio of hydrocarbon solvent to solubilizing agent of 4/1, and LiTFSI as a supporting salt, notably at a molar concentration from 0.1 to 1.0 mol/L in the electrolyte medium.

Applications

The present invention relates to the field of lithium electrochemical generators, which operate according to the principle of insertion or extraction, in other words intercalation and deintercalation, of lithium in at least one electrode.

More particularly, it relates to a lithium electrochemical accumulator comprising at least one elementary electrochemical cell consisting of an anode and a cathode, on either side of a separator impregnated with electrolyte, two current collectors, of which one is connected to the anode and the other to the cathode, and a shell whose shape is elongated along a longitudinal axis (X), the shell being arranged to house the electrochemical cells in a sealed manner while allowing the passage of part of the current collectors forming the output terminals, also called poles.

In particular, the invention relates to a Li-ion battery or accumulator containing an electrolyte according to the invention.

Such a battery usually comprises at least one electrochemical cell consisting of a separator impregnated with an electrolyte medium according to the invention, between a positive electrode or cathode and a negative electrode or anode, a current collector connected to the cathode, and a current collector connected to the anode.

The positive electrode or cathode is usually composed of lithium cation insertion materials which are usually composite, such as lithium iron phosphate $LiFePO_4$, lithium cobalt oxide $LiCoO_2$, lithium manganese oxide, substituted if necessary, $LiMn_2O_4$, or a material based on $LiNi_xMn_y\text{-}Co_zO_2$ where x+y+z=1, such as $LiNi_{0.33}Mn_{0.33}Co_{0.33}O_2$, or a material based on $LiNi_xCo_yAl_zO_2$ where x+y+z=1, LiNiMnCoO$_2$ or lithium nickel cobalt aluminum oxide $LiNiCoAlO_2$.

The negative electrode or anode usually consists of carbon, graphite or $Li_4TiO_5O_{12}$ (titanate material), or if appropriate silicon or lithium or tin and their alloys or silicon-based composite.

The anode and cathode made of lithium-containing insertion material may be deposited by a commonly used technique in the form of an active layer on a metal sheet or strip forming a current collector.

The current collector connected to the positive electrode is usually made of aluminum.

The current collector connected to the negative electrode is usually made of copper, nickel-plated copper, or aluminum.

Conventionally, a Li-ion battery or accumulator uses a pair of materials at the anode and at the cathode, enabling it to operate at a high voltage, typically around 3.6 V.

FIGURES

FIG. 1: Cyclic voltammetry curves in 05DOol and 05Ool solution (working electrode: 3 mm vitreous carbon, counter electrode: platinum wire, reference electrode $Ag^0/Ag^+$, 0.01 M $AgNO_3$/0.1 M $TBAPF_6/CH_3CN$ freshly prepared, E vs $Li^+/Li^0$=3.53 V vs $Ag^0/Ag^+$, 100 mV·s$^{-1}$) (Lu et al. *J. Electrochem. Soc.* 2010, 157 (9), A1016).

FIG. 2: Cyclic voltammetry curves in 06DOyl, 06Oyl and 07Oyl solution in the experimental conditions specified for FIG. 1.

FIG. 3: Cyclic voltammetry curves in a 06TOEC button battery (working electrode: stainless steel wedge, counter electrode: Li metal, separator Clegard®, 0.1 mV·s$^{-1}$).

FIG. 4: Cyclic voltammetry curves in a 06TOEC button battery (working electrode: SuperP:PVDF=80:20 (by weight), counter electrode: Li metal, separator Clegard®, 0.1 mV·s$^{-1}$).

EQUIPMENT AND METHODS

The conductivity measurements were made by means of a MMultyConductimeter thermostatically controlled 12 cell conductimeter produced by MaterialsMates. The measurement cell was filled with 1 mL of electrolyte, and was then connected and placed in a thermostatically controlled sand bath at 22° C. The measurements were made for 2 hours.

The measurements of electrochemistry in solution were made in an electrochemical cell with 3 electrodes (working electrode: 3 mm vitreous carbon, counter electrode: platinum wire, reference electrode $Ag^0/Ag^+$, 0.01 M $AgNO_3$/0.1 M $TBAPF_6/CH_3CN$ freshly prepared, E vs $Li^+/Li^0$=3.53 V vs $Ag^0/Ag^+$, TBA=tetrabutyl ammonium).

An electrode containing 80% by weight of SuperP (Imerys Graphite & Carbon Super C65) and 20% by weight of PVDF (polyvinylidene fluoride) binder was formed according to the following protocol.

400 mg of SuperP was mixed with 950 mg of a 12% solution by weight of PVDF in NMP (N-methylpyrrolidone), and 6.15 g of additional NMP was then added. The resulting mixture was dispersed in a Dispermat at 2000 rpm for 20 minutes, then at 5000 rpm for 5 minutes. The resulting ink was applied (l=200 μm) to aluminum foil on a coating bench, then dried in a kiln at 55° C. The resulting electrode was cut into a 14 mm diameter disk and pressed at 10 tonnes, before being vacuum dried for 48 hours at 80° C.

A battery using the electrode formed in this way was assembled in a glove box with a counter electrode of lithium metal according to the following protocol.

The resulting electrode was stacked facing a 16 mm diameter lithium metal electrode or facing a stainless steel wedge, both separated by a polypropylene-based Celgard® 2400 membrane. The assembly was then soaked in the electrolyte being studied, and was crimped into a stainless steel button battery.

The supporting salt was LiTFSI, marketed by Rhodia Asia Pacific.

Different tests of solubility of LiTFSI were conducted in a hydrocarbon solvent:solubilizing agent mixture (4:1 by weight), and the mixtures containing a maximum of supporting salt (LiTFSI) were characterized by measurements of ionic conductivity and/or electrochemistry in solution or electrochemistry in a button battery.

EXAMPLE 1

3.59 g of LiTFSI was dissolved in 25 mL of decalin:octanol (4:1 by weight), this mixture corresponding to a dissolved salt concentration of 0.5 M.

This electrolyte is referred to hereafter as 05DOol.

EXAMPLE 2

3.59 g of LiTFSI was dissolved in 25 mL of octane:octanol (4:1 by weight), this mixture corresponding to a dissolved salt concentration of 0.5 M.

This electrolyte is referred to hereafter as 05OOol.

EXAMPLE 3 (CONTROL)

3.59 g of LiTFSI was dissolved in 25 mL of octanol, this mixture corresponding to a dissolved salt concentration of 0.5 M.

This electrolyte is referred to hereafter as 05Ool.

EXAMPLE 4

2.15 g of LiTFSI was dissolved in 25 mL of decalin:hexanol (4:1 by weight), this mixture corresponding to a dissolved salt concentration of 0.3 M.

This electrolyte is referred to hereafter as 03DHol.

EXAMPLE 5

4.31 g of LiTFSI was dissolved in 25 mL of decalin:octyl acetate (4:1 by weight), this mixture corresponding to a dissolved salt concentration of 0.6 M.

This electrolyte is referred to hereafter as 06DOyl.

EXAMPLE 6

4.31 g of LiTFSI was dissolved in 25 mL of octane:octyl acetate (4:1 by weight), this mixture corresponding to a dissolved salt concentration of 0.6 M.

This electrolyte is referred to hereafter as 06OOyl.

EXAMPLE 7 (CONTROL)

5.02 g of LiTFSI was dissolved in 25 mL of octyl acetate, this mixture corresponding to a dissolved salt concentration of 0.7 M.

This electrolyte is referred to hereafter as 07Oyl.

EXAMPLE 8

0.86 g of LiTFSI was dissolved in 4 mL of iso-octane:iso-octanol (4:1 by weight), this mixture corresponding to a dissolved salt concentration of 0.6 M.

This electrolyte is referred to hereafter as 06iOiOol.

EXAMPLE 9

0.72 g of LiTFSI was dissolved in 4 mL of octane:iso-octanol (4:1 by weight), this mixture corresponding to a dissolved salt concentration of 0.5 M.

This electrolyte is referred to hereafter as 05OiOol.

EXAMPLE 10

0.86 g of LiTFSI was dissolved in 4 mL of cyclo-octane:octanol (4:1 by weight), this mixture corresponding to a dissolved salt concentration of 0.6 M.

This electrolyte is referred to hereafter as 06cOOol.

EXAMPLE 11

0.43 g of LiTFSI was dissolved in 4 mL of octane:nonanenitrile (4:1 by weight), this mixture corresponding to a dissolved salt concentration of 0.3 M.

This electrolyte is referred to hereafter as 03OOcn.

EXAMPLE 12

0.86 g of LiTFSI was dissolved in 4 mL of toluene:octylethylene carbonate (4:1 by weight), this mixture corresponding to a dissolved salt concentration of 0.6 M.

This electrolyte is referred to hereafter as 06TOEC.

EXAMPLE 13 (CONTROL)

0.14 g of LiTFSI (corresponding to 0.1 M) was dissolved in 5 g of toluene; this mixture is insoluble.

EXAMPLE 14

The ionic conductivities of electrolyte media according to the invention were measured at ambient temperature according to the protocol described above, and the results are shown in Table 1 below.

TABLE 1

| Example | Reference | Ionic conductivity $(mS \cdot cm^{-1})$ |
|---|---|---|
| 1 | 05DOol | 0.01 |
| 2 | 05OOol | 0.06 |
| 5 | 06DOyl | 0.05 |
| 6 | 06OOyl | 0.10 |
| 12 | 06TOEC | 0.12 |

Satisfactory ionic conductivity was thus measured for the electrolyte media according to the invention (satisfactory ionic conductivity starts from 0.001 mS·cm$^{-1}$, preferably from 0.1 mS·cm$^{-1}$). The electrolyte media of Examples 2, 5, 6 and 12 were found to be particularly useful.

EXAMPLE 15

The cyclic voltammetry curves were plotted for certain examples of electrolyte media in the conditions described above.

Thus, FIG. 1 shows the cyclic voltammetry curve obtained in a solution of the electrolyte 05DOol of Example 1, compared with that of the control electrolyte 05Ool of Example 3. In fact, an increase in the effectiveness of the electrolyte according to the invention was found, in terms of the size of the potential range relative to the control electrolyte.

Figure 1:
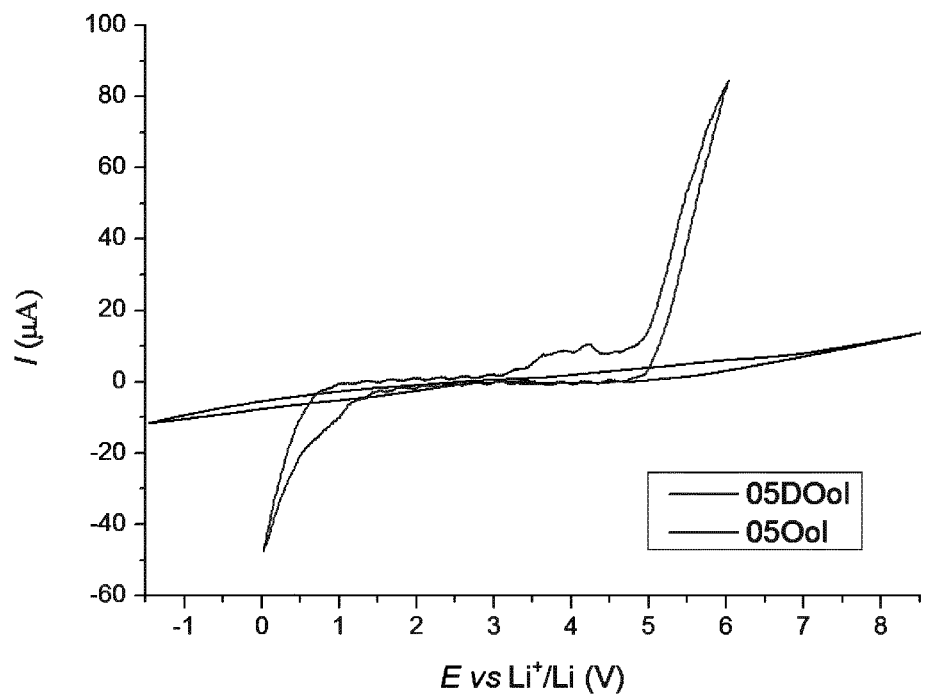
Figure 2:
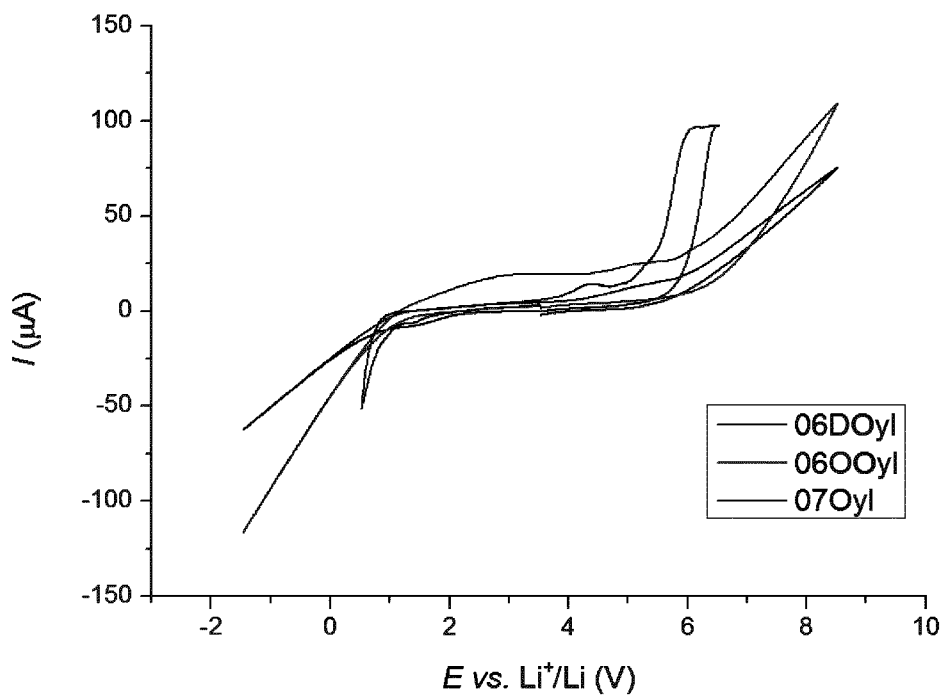
FIG. 2 shows the cyclic voltammetry curves of the electrolyte 06DOyl and 06OOyl of Examples 5 and 6, compared with that of the control electrolyte 06Oyl of Example 7. Here again, an increase in the effectiveness of the electrolyte according to the invention was found in terms of the size of the potential range relative to the control electrolyte.
Figure 3:
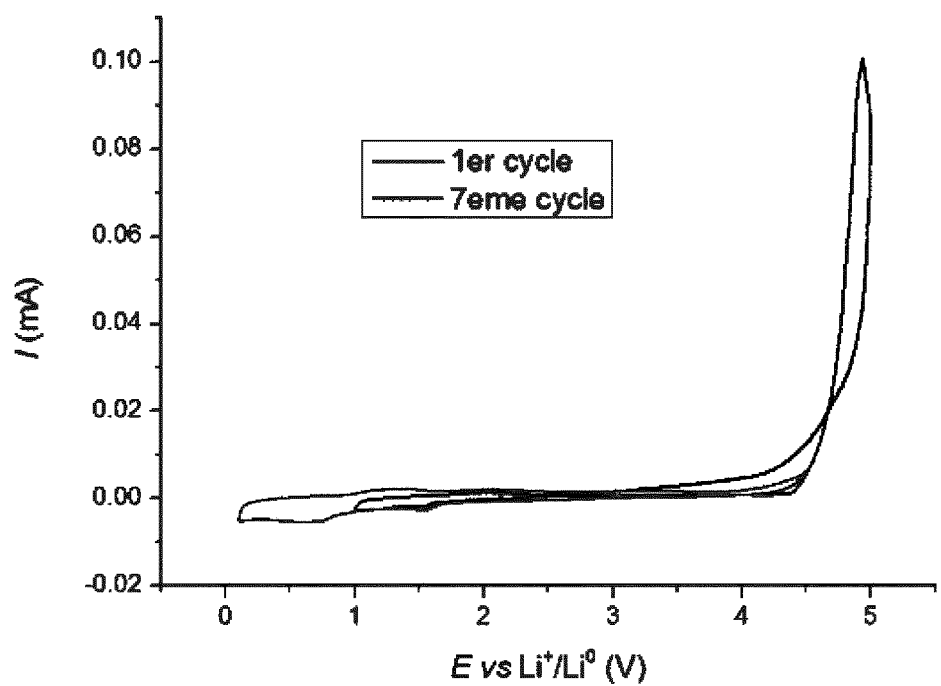
FIGS. 3 and 4 show the cyclic voltammetry curves of the electrolyte 06TOEC in a button battery, with a stainless steel wedge working electrode and a composite SuperP:PVDF working electrode. In this case, the electrolyte exhibited a stability range of about 5 V.
Figure 4:
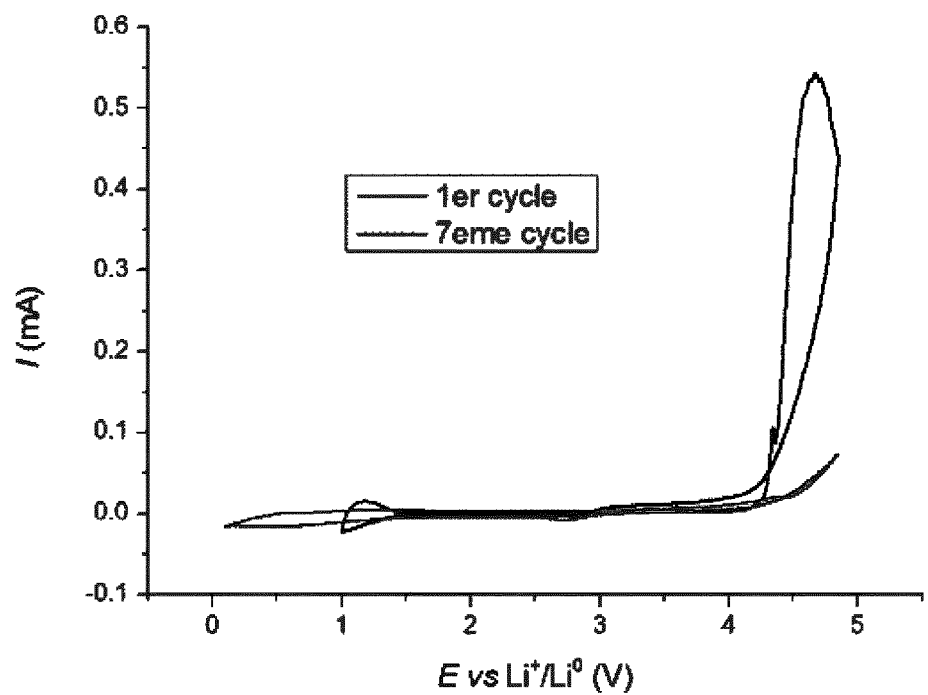

The invention claimed is:

1. A single phase electrolyte medium comprising:
   at least one salt of alkali or alkaline earth metal, at least one hydrocarbon solvent, and
   from 1% to 50%, by volume relative to a total volume of said medium, of at least one hydrocarbon solubilizing agent, distinct from said hydrocarbon solvent,
corresponding to the formula (I):

$$Z-[(A)-(X)]_q-(B)-Y \qquad (1)$$ 

wherein:
A and B, identical or different, have the formula —C$_a$H$_{2a}$—, where a is an integer between 6 and 18,
X is selected from the group consisting of oxygen atoms, sulfur atoms, and radicals —N(R')—, —B(R$^2$)— and —P(R$^3$R$^2$)— where R$^2$ and R$^3$, identical or different, represent a hydrogen atom or an alkyl radical in C$_1$ to C$_4$;

q is equal to zero or is an integer varying from 1 to 8, where A and X may have identical or different definitions in each of units -[(A)-(X)]—, Z represents a hydrogen atom or a group —OH, —OR$^1$, —OM, —NH$_2$, —NHR$^1$, —N(R$^1$)$_2$, —N(R$^1$)$_3^+$, —COOH, —COOM, —COOR$^1$, —OCOR$^1$, —CN, SO$_3$H, or —SO$_3$M, where R$^1$ is an alkyl radical in C$_1$ to C$_4$ and M is a metal ion, or alternatively Z is a cyclocarbonate radical with 5 or 6 links, Y represents a group —OH, —OR$^1$, —OM, —NH$_2$, —NHR$^1$, —N(R$^1$)$_2$, —N(R$^1$)$_3$, —COOH, —COOM, —COOR$^1$, —OCOR$^1$, —CN, —SO$_3$H, or —SO$_3$M where R$^1$ is an alkyl radical in C$_1$ to C$_4$ and M is a metal ion, or alternatively Y is a cyclocarbonate radical with 5 or 6 links, or Y and Z are linked to one another to form a polar pattern of the oxo, ether, ester, amino or secondary or tertiary amine type, and wherein the solubilizing agent having the formula (I) is selected from the group consisting of alkanols, alkyl esters and alkyl cycloalkyl carbonates, and wherein the hydrocarbon solvent is solely composed of carbon and hydrogen atoms.

2. The electrolyte medium as claimed in claim 1, wherein the hydrocarbon solvent is an aliphatic, acyclic or mono- or polycyclic or aromatic hydrocarbon.

3. The electrolyte medium as claimed in claim 1, wherein the hydrocarbon solvent is saturated.

4. The electrolyte medium as claimed in claim 3, wherein the hydrocarbon solvent comprises at least 7 carbon atoms.

5. The electrolyte medium as claimed in claim 3, wherein the hydrocarbon solvent is selected from the group consisting of decalin, octane, iso-octane and cyclo-octane.

6. The electrolyte medium as claimed in claim 1, wherein the hydrocarbon solvent is aromatic.

7. The electrolyte medium as claimed in claim 6, wherein the hydrocarbon solvent comprises 7 to 12 carbon atoms.

8. The electrolyte medium as claimed in claim 6, wherein the hydrocarbon solvent is toluene.

9. The electrolyte medium as claimed in claim 1, wherein the radicals A and B, identical or different, have the formula —C$_a$H$_{2a}$—, where a is an integer between 6 and 12.

10. The electrolyte medium as claimed in claim 1, wherein the solubilizing agent having the formula (I) is linear and saturated.

11. The electrolyte medium as claimed in claim 10, wherein the solubilizing agent is linear and saturated and in C$_7$ to C$_{18}$.

12. The electrolyte medium as claimed in claim 10, wherein q is equal to zero.

13. The electrolyte medium as claimed in claim 1, wherein the solubilizing agent is selected from the group consisting of octanol, iso-octanol, hexanol, octyl acetate, hexyl acetate and octylethylene carbonate.

14. The electrolyte medium as claimed in claim 1, comprising t at least one solubilizing agent in C$_6$ to C$_{12}$ of the acyclic alkanol, alkyl ester or alkyl cycloalkyl carbonate type, and t hydrocarbon solvent in C$_6$ to C$_{12}$ of the hydrocarbon type.

15. The electrolyte medium as claimed in claim 14, wherein the ratio by volume of the hydrocarbon solvent to the solubilizing agent is between 6/1 and 2/1.

16. The electrolyte medium as claimed in claim 14, wherein the ratio by volume of the hydrocarbon solvent to the solubilizing agent is equal to 4/1.

17. The electrolyte medium as claimed in claim 1, comprising a hydrocarbon solvent/solubilizing agent pair chosen from among decalin/octanol, octane/octanol, decalin/hexanol, iso-octane/iso-octanol, cyclooctane/octanol, decalin/octyl acetate, octane/octyle acetate, decalin/octylethylene carbonate, toluene/octylethylene acetate, octane/iso-octanol or toluene/octylethylene carbonate airs.

18. The electrolyte medium as claimed in claim 1, comprising, as an electrolyte salt, at least one compound selected from the group consisting of LiClO$_4$, LiAsF$_6$, LiPF$_6$, LiBF$_4$, LiR$_F$SO$_3$, LiCH$_3$SO$_3$, LiN(R$_F$SO$_2$)$_2$, LiC(R$_F$SO$_2$)$_3$, and C$_6$F$_3$LiN$_4$; R$_F$ being selected from the group consisting of a fluorine atom and a perfluoroalkyl group comprising between 1 and 8 carbon atoms.

19. An electrochemical lithium accumulator of the Li-ion type, comprising at least one electrolyte medium as claimed in claim 1.

20. The electrolyte medium as claimed in claim 1, wherein the salt of alkali or alkaline earth metal is a lithium salt.

* * * * *